(12) United States Patent
Ferreira et al.

(10) Patent No.: US 11,915,153 B2
(45) Date of Patent: Feb. 27, 2024

(54) WORKLOAD-ORIENTED PREDICTION OF RESPONSE TIMES OF STORAGE SYSTEMS

(71) Applicant: EMC IP HOLDING COMPANY LLC, Hopkinton, MA (US)

(72) Inventors: Paulo Abelha Ferreira, Rio de Janeiro (BR); Adriana Bechara Prado, Niterói (BR); Pablo Nascimento da Silva, Niterói (BR)

(73) Assignee: Dell Products, L.P., Hopkinton, MA (US)

( * ) Notice: Subject to any disclaimer, the term of this patent is extended or adjusted under 35 U.S.C. 154(b) by 332 days.

(21) Appl. No.: 16/865,465

(22) Filed: May 4, 2020

(65) Prior Publication Data
US 2021/0342712 A1    Nov. 4, 2021

(51) Int. Cl.
G06N 5/04 (2023.01)
G06F 16/11 (2019.01)
G06N 20/20 (2019.01)
G06N 5/01 (2023.01)

(52) U.S. Cl.
CPC ............... *G06N 5/04* (2013.01); *G06F 16/11* (2019.01); *G06N 5/01* (2023.01); *G06N 20/20* (2019.01)

(58) Field of Classification Search
CPC .......... G06N 5/04; G06N 20/20; G06N 5/003; G06F 16/11
See application file for complete search history.

(56) References Cited

U.S. PATENT DOCUMENTS

| | | | | |
|---|---|---|---|---|
| 7,721,061 | B1 * | 5/2010 | Kelly | G06F 11/3447 |
| | | | | 709/224 |
| 10,970,186 | B2 * | 4/2021 | Salunke | G06F 11/079 |
| 2014/0341462 | A1 * | 11/2014 | Sezginer | G06N 20/00 |
| | | | | 382/149 |
| 2016/0328273 | A1 * | 11/2016 | Molka | A61B 8/00 |
| 2016/0349992 | A1 * | 12/2016 | Basak | G06F 3/0647 |
| 2019/0294484 | A1 * | 9/2019 | Luo | G06N 20/00 |
| 2020/0026962 | A1 * | 1/2020 | Sha | G03F 7/705 |
| 2020/0393981 | A1 * | 12/2020 | Dutta | G06N 20/00 |
| 2021/0184941 | A1 * | 6/2021 | Tootaghaj | G05B 6/02 |
| 2021/0224178 | A1 * | 7/2021 | Singh | G06F 9/44505 |
| 2021/0241131 | A1 * | 8/2021 | Khawas | G06N 20/20 |

* cited by examiner

*Primary Examiner* — Albert M Phillips, III
*Assistant Examiner* — Courtney Harmon
(74) *Attorney, Agent, or Firm* — Anderson Gorecki LLP

(57) ABSTRACT

Training examples are created from telemetry data, in which each training example engineered features derived from the telemetry data, storage system characteristics about the storage system that processed the workload associated with the telemetry data, and the response time of the storage system while processing the workload. The training examples are provided to an unsupervised learning process which assigns the training examples to clusters. Training examples of each cluster are used to train/test a separate supervised learning process for the cluster, to cause each supervised learning process to learn a regression between independent variables (system characteristics and workload features) and a dependent variable (storage system response time). To determine a response time of a proposed storage system, the proposed workload is used to select one of the clusters, and then the trained learning process for the selected cluster is used to determine the response time of the proposed storage system.

18 Claims, 10 Drawing Sheets

FIG. 7

| X (input) | | | | Y (output) |
|---|---|---|---|---|
| Storage System Characteristics | Feature #1 %read | ● ● ● | Feature #2 %read hits | Response Time |
| Storage System #1 | 0.909 | ● ● ● | 0.800 | 0.3 |
| Storage System #2 | 0.889 | ● ● ● | 0.785 | 0.4 |
| Storage System #2 | 0.882 | ● ● ● | 0.485 | 0.5 |
| Storage System #2 | 0.857 | ● ● ● | 0.589 | 0.5 |
| Storage System #3 | 0.888 | ● ● ● | 0.778 | 0.9 |
| Storage System #3 | 0.882 | ● ● ● | 0.554 | 0.6 |
| Storage System #3 | 0.857 | ● ● ● | 0.322 | 0.6 |

} Training Examples for Cluster #1

| X (input) | | | | Y (output) |
|---|---|---|---|---|
| Storage System Characteristics | Feature #1 %read | ● ● ● | Feature #2 %read hits | Response Time |
| Storage System #1 | 0.769 | ● ● ● | 0.566 | 0.5 |
| Storage System #2 | 0.769 | ● ● ● | 0.454 | 0.5 |
| Storage System #3 | 0.769 | ● ● ● | 0.668 | 0.7 |
| Storage System #n | 0.727 | ● ● ● | 0.448 | 0.8 |
| Storage System #n | 0.750 | ● ● ● | 0.225 | 0.7 |

} Training Examples for Cluster #2

| X (input) | | | | Y (output) |
|---|---|---|---|---|
| Storage System Characteristics | Feature #1 %read | ● ● ● | Feature #2 %read hits | Response Time |
| Storage System #1 | 0.166 | ● ● ● | 0.111 | 1.0 |
| Storage System #1 | 0.500 | ● ● ● | 0.3 | 1.1 |
| Storage System #n | 0.571 | ● ● ● | 0.441 | 0.5 |
| Storage System #n | 0.476 | ● ● ● | 0.174 | 0.8 |
| Storage System #n | 0.512 | ● ● ● | 0.444 | 1.2 |

} Training Examples for Cluster #3

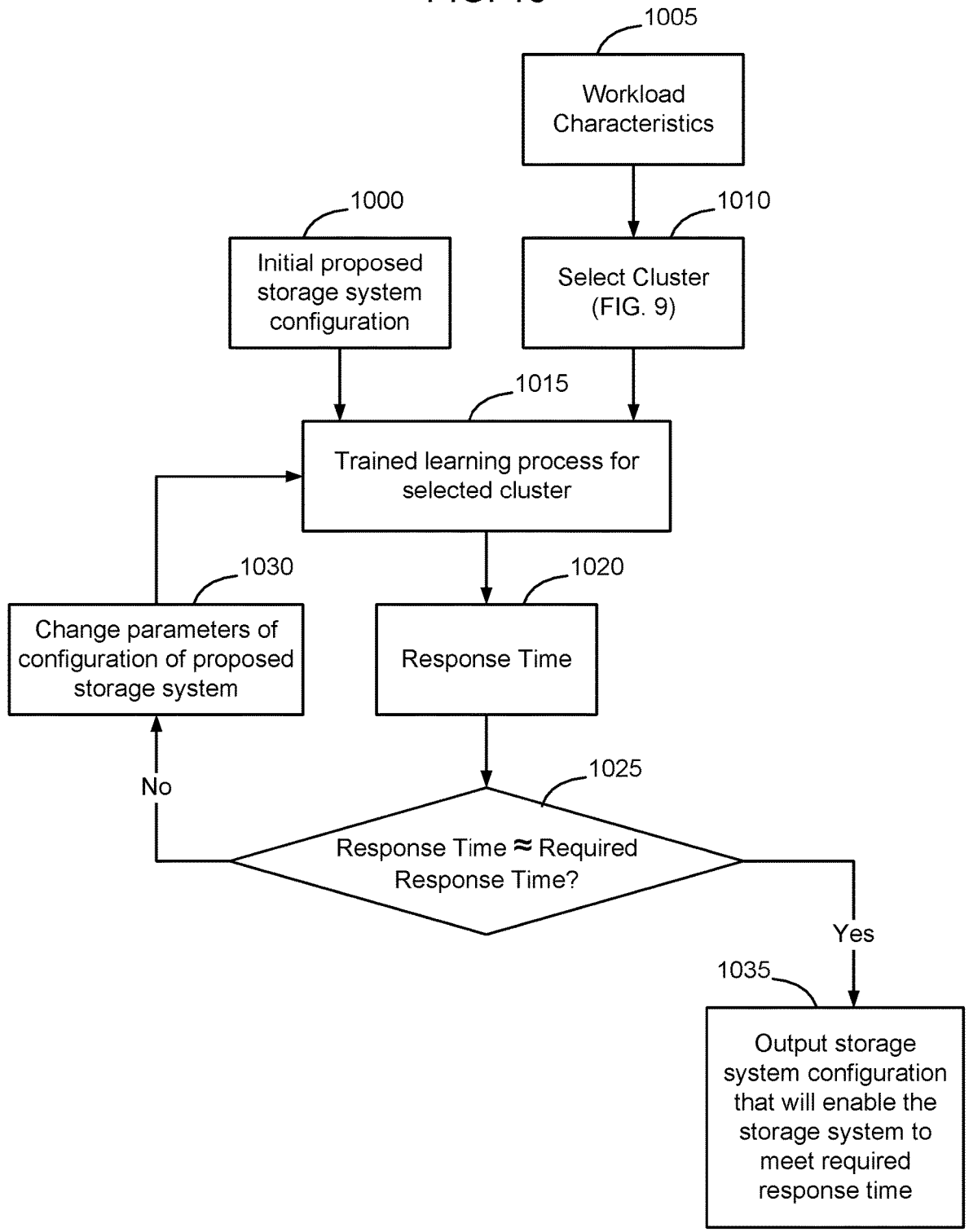

WORKLOAD-ORIENTED PREDICTION OF RESPONSE TIMES OF STORAGE SYSTEMS

FIELD

This disclosure relates to computing systems and related devices and methods, and, more particularly, to a method and apparatus for workload-oriented prediction of response times of storage systems.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, training examples are created from telemetry data, in which each training example engineered features derived from the telemetry data, storage system characteristics about the storage system that processed the workload associated with the telemetry data, and the response time of the storage system while processing the workload. The training examples are provided to an unsupervised learning process which assigns the training examples to clusters. Training examples of each cluster are used to train/test a separate supervised learning process for the cluster, to cause each supervised learning process to learn a regression between independent variables (system characteristics and workload features) and a dependent variable (storage system response time). To determine a response time of a proposed storage system, the proposed workload is used to select one of the clusters, and then the trained learning process for the selected cluster is used to determine the response time of the proposed storage system.

BRIEF DESCRIPTION OF THE DRAWINGS

FIG. 7 is a functional block diagram of a set of example data structures, each data structure containing a set of training examples associated with a given cluster, each training example including storage system characteristics, workload features, and storage system response time, according to some embodiments.

FIG. 10 is a flow chart of an example process of iterating the process of using a selected trained learning process to determine a system configuration capable of providing a required response time for a proposed workload, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
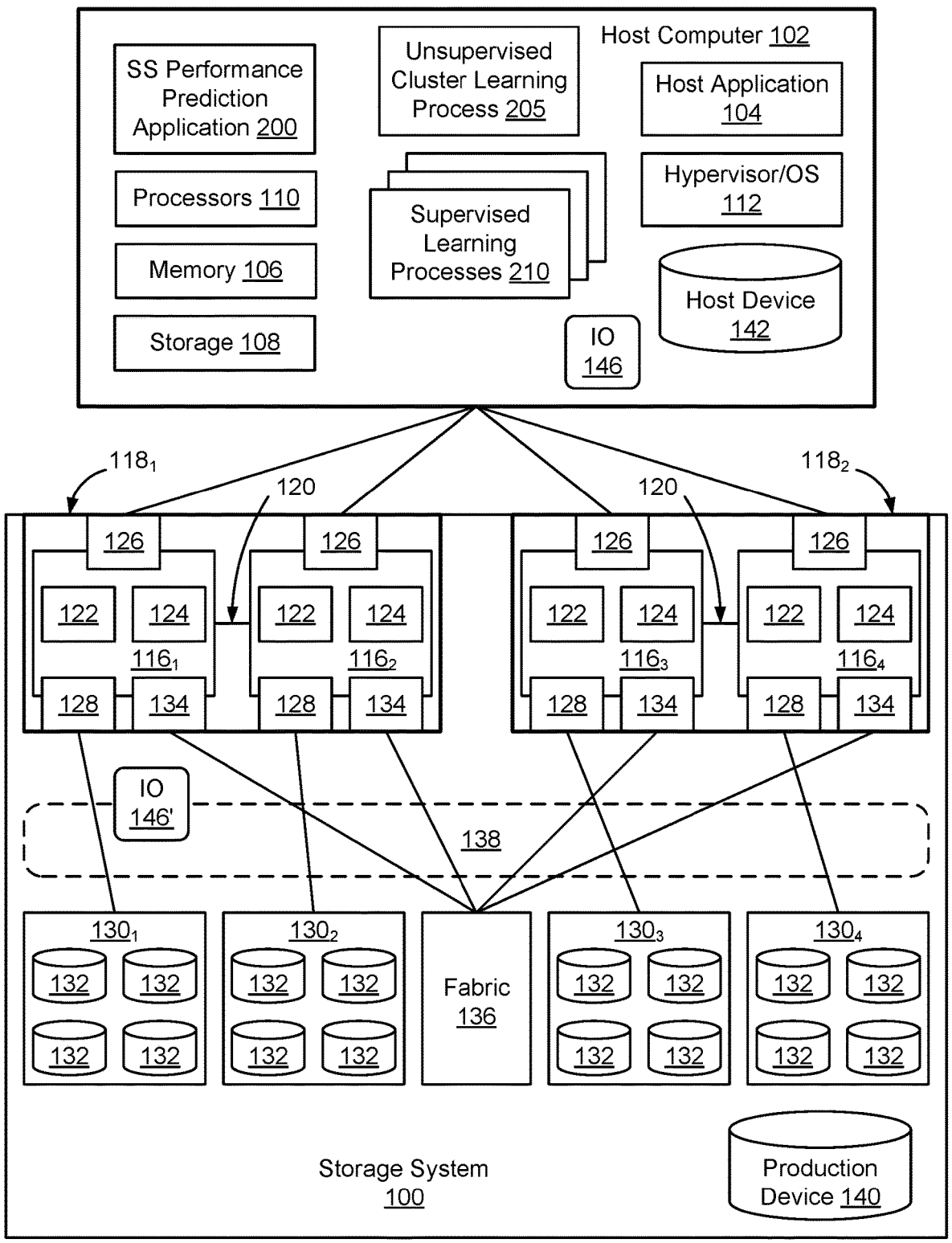
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect Express) bus, or may be connected to the compute nodes $116_1$-$116_4$, for example, by an InfiniBand (IB) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes 116$_1$-116$_4$ and paths, although the storage system 100 can be configured to limit use of certain paths to certain production devices 140.

There are many ways to configure a storage system 100 such as the storage system of FIG. 1, and different storage system configurations would be expected to exhibit different response times when faced with the same workload. For example, in some embodiments, the number of storage engines 118 and number of back-end drive arrays may be changed depending on the configuration. Likewise, numerous other aspects of the storage system configuration can affect the response time of the storage system to a particular workload. Example aspects include the number and capacity of the managed drives 132, the size of local volatile memory 124, information about how the storage system 100 is executing, such as the number of mirroring processes being used to protect data stored on the managed drives 132, and other parameters. Further, information about the individual components may affect operation of the storage system. For example, the number of cores 122 in the compute nodes 116, the type of operating system in use on the compute nodes 116, the number of cores in the adapters (e.g. front-end adapter 126, back-end adapter 128, or channel adapter 134), the number of ports in the various system components, and numerous other parameters all can affect the response time that the storage system will provide when processing a particular workload.

When a customer is looking to acquire a storage system to handle a particular proposed workload, or if the customer would like to upgrade an existing storage system, for example by adding a storage engine 118, the customer may want to know whether a particular storage system configuration will be capable of achieving an adequate response time for a proposed workload. If the proposed storage system configuration is not capable of meeting the customer's required response time parameters, the system configuration may need to be changed, for example to add an additional storage engine or back-end drive array 130. Accordingly, sizing the storage system 100 is an important aspect to determining what infrastructure is required to support a particular customers' needs. However, sizing a storage system is often done without knowing exactly if the sized infrastructure will satisfy the response-time requirements of the host applications 104.

As discussed in greater detail herein, in some embodiments one of the host applications 104 is a storage system performance prediction application 200 configured to predict a storage system response time, when provided with a proposed storage system configuration and features characterizing the proposed workload. In some embodiments, as discussed in greater detail below, the storage system performance prediction application 200 is associated with an unsupervised cluster learning process 205 and a set of supervised learning processes 210 (one for each cluster). Although FIG. 1 shows both the storage system performance prediction application 200 and learning processes 205, 210 implemented on the same host 104, in some embodiments the storage system performance prediction application 200 and learning processes 205, 210 are implemented on separate hosts 104 or on a stand-alone computer not affiliated with or connected to storage system 100.

Figure 2:
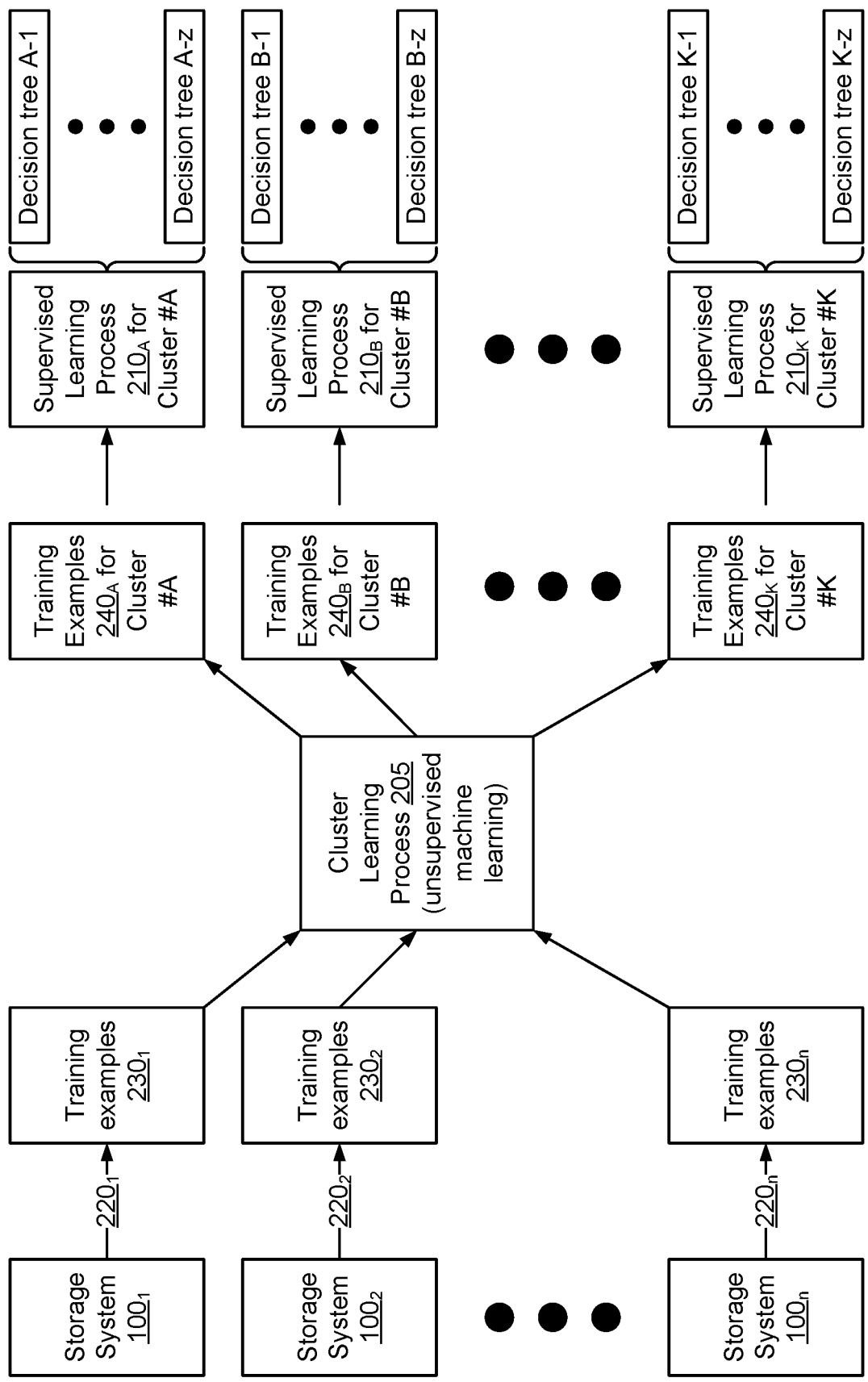
FIG. 2 is a functional block diagram of a method of training a set of supervised learning processes to implement a workload-oriented system for predicting response times of storage systems, according to some embodiments.

FIG. 2 is a functional block diagram of a method of training a workload-oriented system for predicting response times of storage systems, according to some embodiments. As shown in FIG. 2, in some embodiments telemetry data 220$_1$-220$_n$ is collected from a large number of storage systems 100$_1$-100$_n$ with different system configurations. The telemetry data 220 is used to create training examples 230$_1$-230$_n$, in which each training example includes engineered features of interest that are derived from the telemetry data. In some embodiments, each training example further includes parameters describing the configuration of the storage system 100 that provided the telemetry data, and the storage system response time of the storage system when the storage system was presented with the workload associated with the telemetry data. Additional details regarding creation of training examples is discussed below in connection with FIGS. 4-5. In some embodiments, the telemetry data from a given storage system 100 can be used to create multiple training examples, for example by processing telemetry data from the storage system during multiple time intervals during which the storage system processed workloads with different characteristics.

Figure 6:
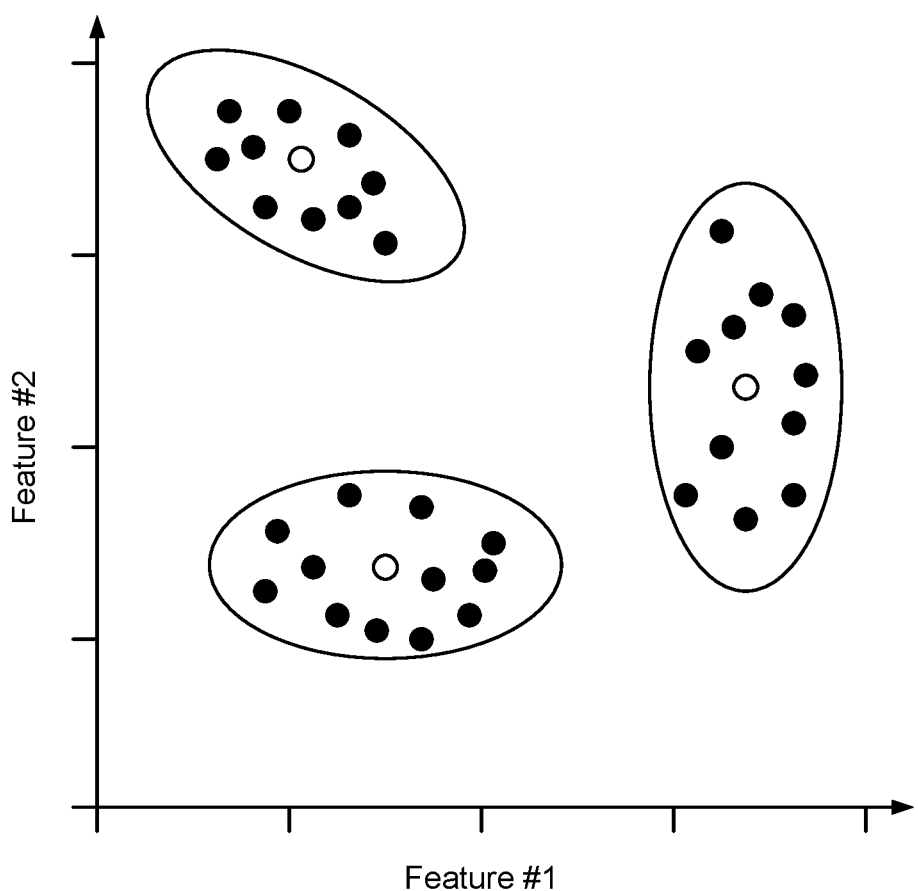
FIG. 6 is a graph showing an example clustering of training examples based on workload features using an unsupervised cluster learning process, according to some embodiments.

As shown in FIG. 2, the training examples are input to a cluster learning process 205 which, in some embodiments, is an unsupervised machine learning process. The cluster learning process 205 assigns the training examples to a set of K clusters, in which K is an integer greater than one (K≥2). In some embodiments, the unsupervised machine learning process assigns the training examples to between 5 and 20 clusters (5≤K≤20), although the number of clusters can vary depending on the implementation. FIG. 6 is a graph showing an example set of clusters, in which K=3.

Clustering is a machine learning task of grouping a set of examples in such a way that the examples in the same group (referred to herein as a cluster) are more similar to each other than those in other groups of instances (other clusters). Example clustering algorithms include k-means and Expectation Maximization, although other cluster learning algorithms may be used as well depending on the embodiment. Additional information regarding clustering and the unsupervised machine learning process used to implement the cluster learning process 205 is discussed below in connection with FIGS. 6-7.

In some embodiments, the workload features of the training examples are used by the cluster learning process 205 to assign the training examples to clusters such that training examples with similar workload features are grouped (clustered). Accordingly, as shown in FIG. 2, the cluster learning process 205, in some embodiments, assigns the training examples to sets, with each set of training examples belonging to exactly one cluster. In FIG. 2 the training examples are assigned to K sets of training examples 240$_A$-240$_K$.

Each set (cluster) of training examples is used to train/test a separate supervised learning process 210 for the cluster. Thus, for example, the training examples in cluster #A 240$_A$ are used to train and test a supervised learning process 210$_A$ for cluster #A. The training examples in cluster #B 240$_B$ are used to train and test a supervised learning process 210$_B$ for cluster #B. The training examples in cluster #K 240$_K$ are used to train and test a supervised learning process 210$_K$ for cluster #K. By using training examples that have been clustered based on workloads, such that the training examples that are used to train a given supervised learning process have similar workload features, it is possible to more accurately train the supervised learning processes 210$_A$-210$_K$, to cause each supervised learning processes to learn a regression between storage system characteristics and workload features, and storage system response time.

For example, since the training examples that are used to train a supervised learning process have similar workload characteristics, it is possible to achieve a greater correlation within the trained learning process between system characteristics and response times for particular workload parameters. In some embodiments, the supervised learning processes $210_A$-$210_K$ are implemented as deep neural networks, decision trees, or regression forests, although other types of supervised learning processes may be used as well depending on the implementation.

Figure 3:
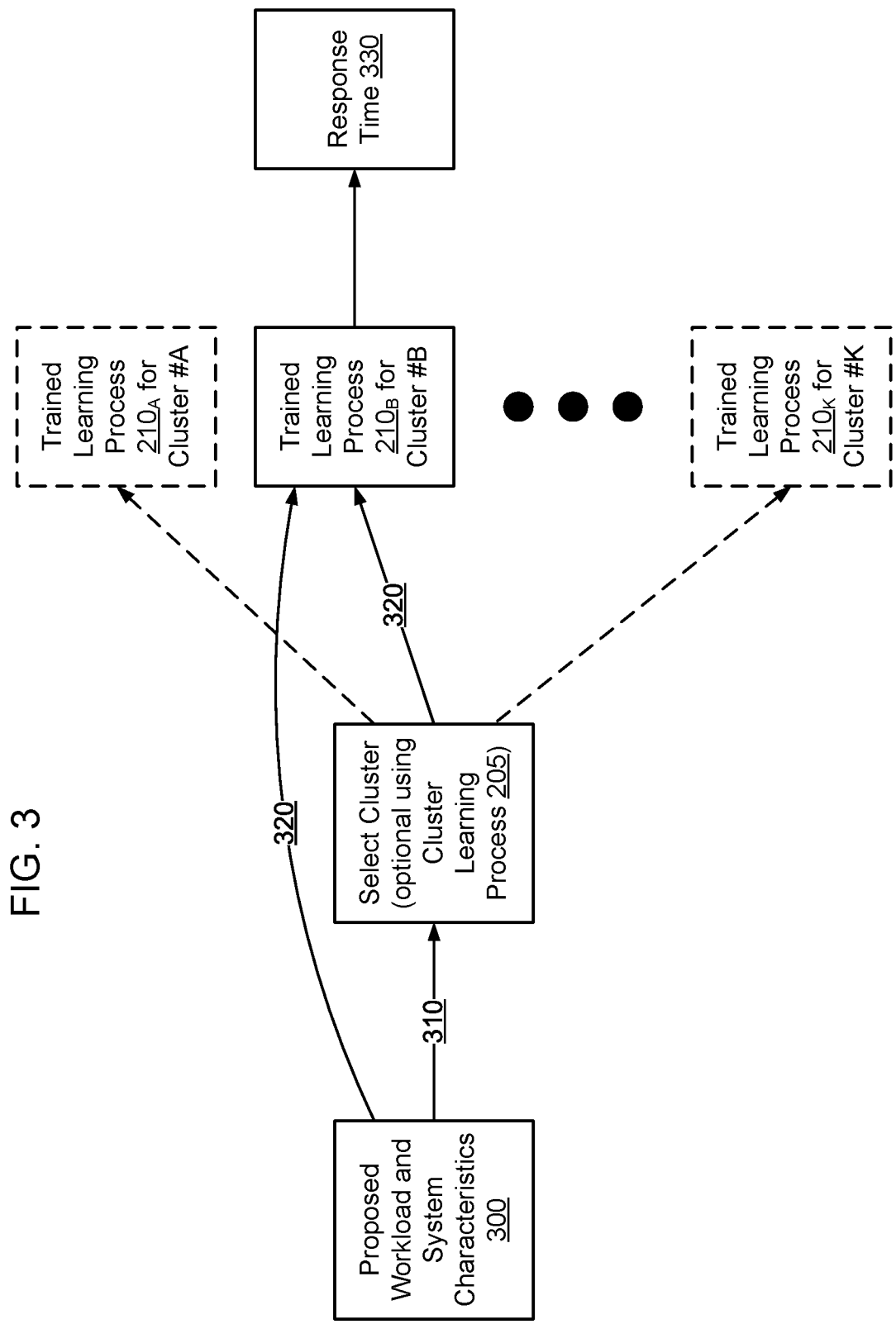
FIG. 3 is a functional block diagram of a method of using a set of trained learning processes to predict a response time of a proposed storage system for a proposed workload, according to some embodiments.

FIG. 3 is a functional block diagram of a method of using a workload-oriented set of trained learning processes to predict the response time of a proposed storage system, according to some embodiments. As shown in FIG. 3, in some embodiments the set of trained learning processes is configured to receive, as input, a proposed workload and set of system characteristics 300. The proposed workload is processed to determine a set of workload features that enable the workload to be characterized in the same way as the training examples. For example, if the training examples used, as features, a percentage of read operations to total operations, and a percentage of sequential read operations to total operations, then the proposed workload is processed to characterize the proposed workload in terms of percentage of read operations to total operations, and a percentage of sequential read operations to total operations. The characterized workload 310 is then processed to determine which cluster the proposed workload most closely approximates. The cluster selection process may be implemented, in some embodiments, by the unsupervised learning process by providing the proposed workload as input to the unsupervised learning process and receiving, as output, an identity of the cluster to which the proposed workload is assigned. In other embodiments another cluster selection process is used. For example, in some embodiments a minimum Euclidian distance between the locus of the proposed workload and the centroids of each of the clusters is determined, and the proposed workload is assigned to the cluster having the centroid that has the closest Euclidian distance to the locus of the proposed workload.

Once a cluster has been selected for the proposed workload, the proposed workload and system characteristics are passed to the trained learning process for that cluster. In the example shown in FIG. 3, it will be assumed that the proposed workload most closely fits within cluster #B. Accordingly, the proposed workload and system characteristics 300 are passed (arrow 320) to the trained learning process 210B for cluster #B, but are not passed to any of the other trained learning processes 210A . . . 210K. The proposed workload and system characteristics 300 may be passed (arrow 320) directly from the system input or may be output by the cluster learning process 205 to the trained learning process $210_B$. The trained learning process $210_B$ for the selected cluster is used to determine a predicted response time 330 of a storage system having the proposed system characteristics under the proposed workload.

Figure 4:
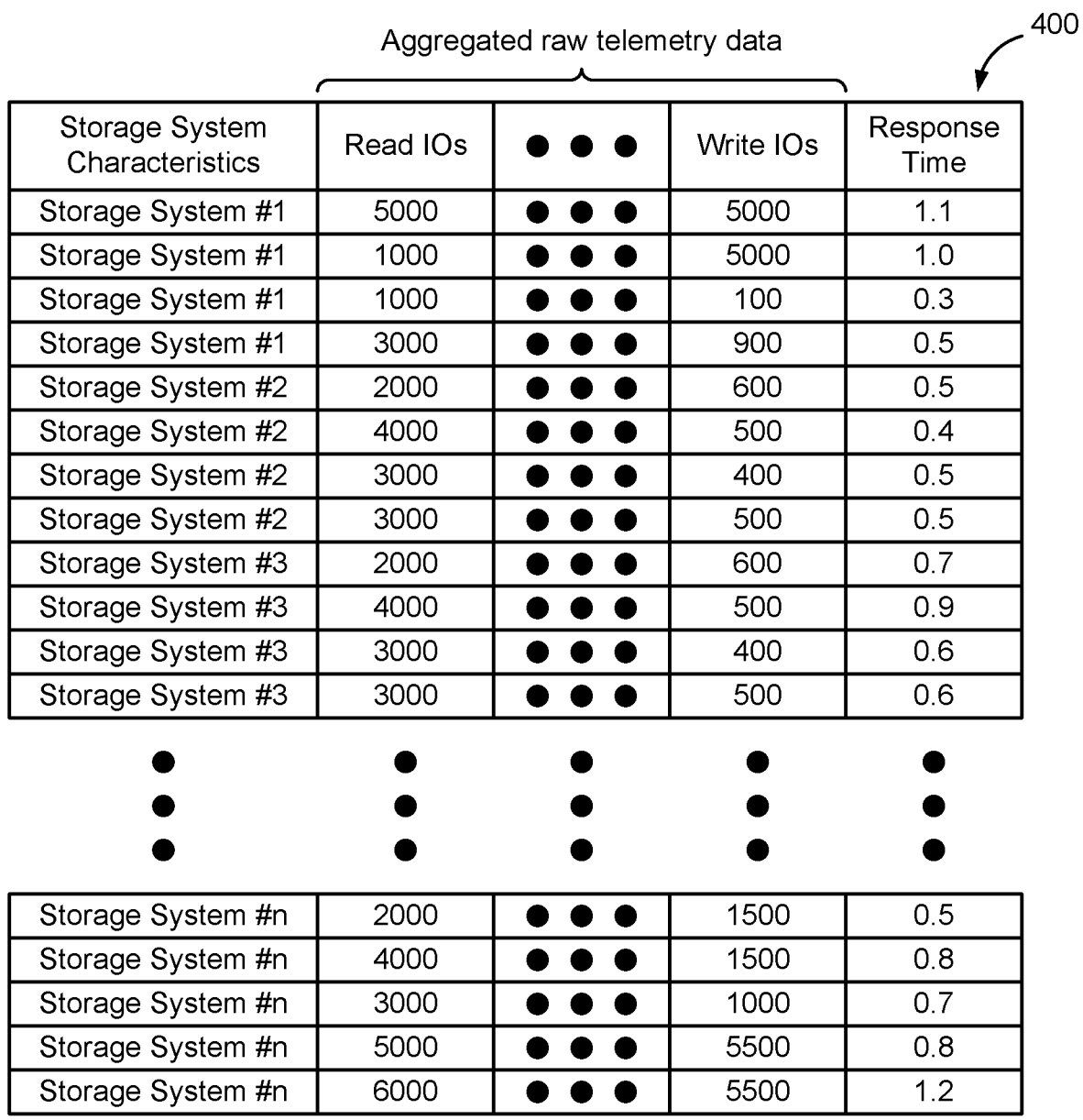
FIG. 4 is a functional block diagram of an example data structure containing storage system characteristics, workload telemetry data, and storage system response times, for use in creating training examples to train the set of learning processes of FIG. 2, according to some embodiments.

FIG. 4 is a functional block diagram of an example data structure 400 containing storage system characteristics, aggregated raw telemetry data, and storage system response time, for use in creating training examples, according to some embodiments. As shown in FIG. 4, in some embodiments, telemetry data is collected from multiple storage systems.

FIG. 4 shows an example of a collection of raw aggregated telemetry data, provided by the storage systems 100.

In some embodiments, each row of raw aggregated telemetry data includes information about the type of workload processed by the storage system during a time interval. For example, as shown in FIG. 4, the raw aggregated telemetry data may include the number of read operations, number of write operations, and other information about the workload that was processed by a given storage system in a particular time interval, and the average storage system response time during the time interval.

There are many ways to characterize a workload. For example, the workload may be summarized by looking at the total number of IO operations, the total number of read operations, the percentage of reads to writes, the total number of reads that were able to be served from cache, the size of the reads that were able to be served from the cache, the total number of reads that were not able to be served from the cache (cache misses), the sequentiality of the read requests, and numerous other aspects. Similar parameters may be used to characterize the write operations.

In some embodiments, telemetry data is cleansed such that data associated with older storage systems is discarded, or telemetry data showing storage system response times that are clearly outside of an expected range is discarded. Other data cleansing steps may be implemented as well, to arrive at a set of telemetry data indicative of storage system response times when presented with a given workload.

The telemetry data is then engineered to add features to the telemetry data. For example, in an embodiment where it is desired to characterize the telemetry by types of workloads. In some embodiments, raw aggregated telemetry data is processed to create engineered features such as IO reads (by percentage), IO sequential reads (by percentage), IO read hits (by percentage), IO write hits (by percentage), and other features. Different embodiments may create different engineered features from the raw aggregated telemetry data.

Figure 5:
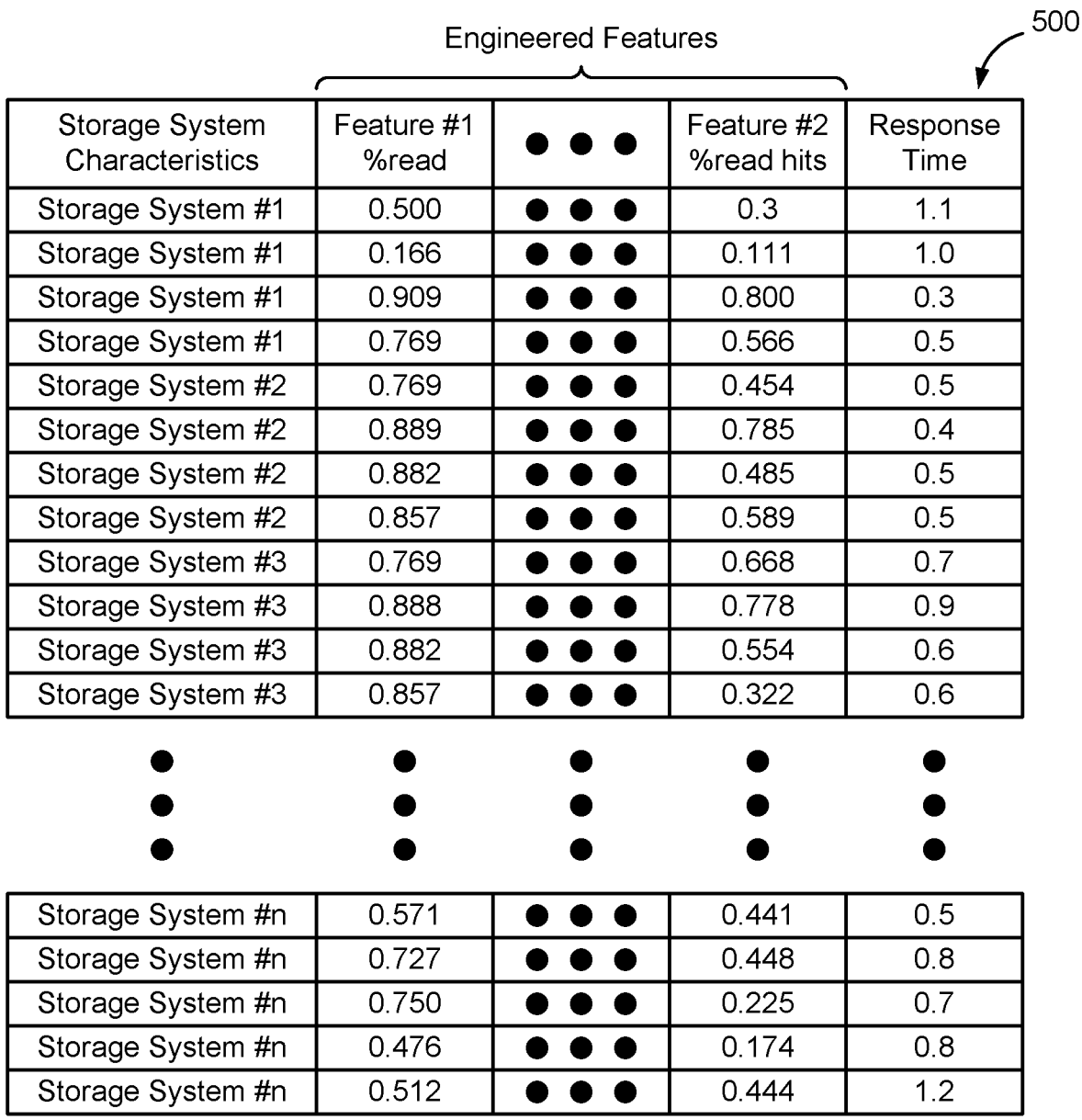
FIG. 5 is a functional block diagram of an example data structure containing training examples, each training example including storage system characteristics, workload features, and storage system response time, for use in training the set of supervised learning processes of FIG. 2, according to some embodiments.

FIG. 5 is a functional block diagram of an example data structure 500 containing an example set of training examples, each training example including storage system characteristics associated with the storage system that processed the telemetry data, engineered workload features derived from the telemetry data, and average response time that the storage system provided when processing the workload associated with the training example, according to some embodiments. FIG. 5 shows an example set of training examples, in which the telemetry data has been aggregated or engineered to create features of interest. For example, instead of looking at the total number of read operations during an interval, it may be preferable to create a feature that is based on the percentage of read operations to total operations (read plus write) operations performed by the storage system during the interval.

Accordingly, in some embodiments, the raw telemetry data shown in FIG. 4 is processed to create (engineer) features that characterize the workload that was processed by the storage system during the interval associated with the training example. Example engineered features may include percentage read operations, percentage sequential read operations, percentage read operations that were cache hits; percentage write hits, and other similar features.

The training examples (all training examples in some embodiments) are then input to an unsupervised learning process 205 to enable the training examples to be assigned to K clusters. Clustering the training examples enables the training examples to be grouped according to their workload characteristics. The output of the unsupervised learning process is a set of clusters of training examples. Each cluster of training examples includes training examples that were created from telemetry data associated with storage systems with different storage system characteristics, as those different storage systems processed workloads having similar workload characteristics.

FIG. 6 is a graph showing an example clustering of training examples based on workload features, according to some embodiments. As described above, in some embodiments a cluster learning process 205 is used to group workloads according to their characteristics. In some embodiments, the cluster learning process 205 is an unsupervised learning process such as a k-means process or an expectation-maximization process, although other unsupervised learning processes that are configured to perform clustering may be used as well.

A K-means process is a learning process that is configured to identify a fixed number of clusters (K) in a data set. The training examples are embedded in M-dimensional space (where M is the number of features of interest) and a set of K points within the M-dimensional space is selected. In some embodiments, the K-means algorithm starts by selecting K random points to be each cluster's centroid. All points are then assigned to their nearest centroid (using Euclidean distance). Centroids are then re-calculated based on the assigned points. This process is repeated until the algorithm converges (stops changing the assignment of points to centroids). At the end of the application of the K-means algorithm, a converged assignment of each point to a centroid exists. That is, each point is assigned a cluster.

In the example shown in FIG. 6, there are two features of interest (M=2) and the K-means process is configured to group data points into three clusters (K=3). As shown in FIG. 6, each training example is embedded on a graph according to the values of Feature #1 and Feature #2 of that training example. The K-means process selects K=3 sets of points and calculates the sum of squares (how far the individual measurements deviate from the mean), and iterates the calculations moving the K=3 sets of points about within the graph until the process converges on a set of three points that are mathematically closest to the collection of other points on the graph. In FIG. 6 the black dots are the training examples and the circles are the centroids of the clusters. The ovals denote which training examples are contained in each cluster. Although the example shown in FIG. 6 has used only two features of interest and three clusters, other values of K and M may be used depending on the implementation. Likewise, although some embodiments are described in which a K-means process is used to implement clustering of the training examples, other unsupervised learning processes such as an Expectation-Maximization process can also be used. Accordingly, although some embodiments have been described in which the clustering is implemented using particular unsupervised machine learning algorithms, in other embodiments different unsupervised machine learning algorithms are used and, accordingly, the particular machine learning algorithm will depend on the particular implementation.

FIG. 7 is a functional block diagram of a set of example data structures, each data structure containing a set of training examples associated with a given cluster. The training examples shown in FIG. 7 are the same as the training examples shown in FIG. 5, and each training example includes storage system characteristics, workload features, and storage system response time.

For ease of explanation, FIG. 7 shows the training examples of FIG. 5 grouped into three subsets (clusters) based on feature #1. The top subset of training examples includes training examples that have a value of feature #1 in the range of about between 0.85 and 0.91. The middle subset of training examples includes training examples that have a value of feature #1 in a range of about 0.73-0.77. The bottom subset of training examples includes training examples that have a value of feature #1 in a range of about 0.015-0.57. Optionally, the training example with a value of feature #1 that is equal to 0.166 may be discarded from the third set of training examples, to tighten up the cluster range to include only training examples that have a value of feature #1 that is between about 0.45-0.57.

As illustrated in this simplistic example, it is possible to assign the training examples to separate subsets (clusters), in which each subset of training examples is determined by the cluster learning process 205. Advantageously, the unsupervised learning process is not required to be trained, but rather simply is provided with a set of training examples, and learns workload features that most clearly enable the training examples to be assigned to the desired number of clusters.

Once the universe of training examples is assigned to subsets by the unsupervised learning process 205, each subset of training examples is used to train a separate supervised learning process 210. Stated differently, as shown in FIG. 2, a separate supervised learning process 210 is trained for each cluster, such that the training examples associated with the cluster are used to train/test the learning process 210 for that cluster. In some embodiments, a specialized regression model 210 is built for each cluster found by the unsupervised learning process 205, such that a specialized prediction model is trained for each type of workload found in the data. In some embodiments, as shown in FIG. 2, a respective random forest such as a group of decision trees is used to implement the supervised learning process 210 for each cluster.

In some embodiments, for each learning process 210, a first percentage of the training examples are used to train the learning process and a second percentage of the training examples are used to test the learning process during the training phase to determine if the learning process is sufficiently trained. The test examples are training examples that have not been seen before. For example, in an embodiment in which the supervised learning process is being trained to predict a response time for a given workload and storage system configuration, a test example would be used to provide, as input, a proposed workload and storage system configuration, and then the response time output of the supervised learning process would be compared to the actual response associated with the training example to determine whether the learning process is sufficiently accurate. In this manner, the learning process can be tested to ensure that the output provided by the learning process is accurate.

Many types of supervised learning processes can be used, depending on the implementation. In some embodiments, the learning processes 210 are decision trees. Decision trees are tree-like structures in which the branches represent decisions and the leaves represent the result. Decision points (nodes) in the tree might be based on storage system configuration attributes, workload features, or a combination of both. For example, a root node of the tree might query whether a storage system 100 has more than two storage engines 118. If the answer is yes, the next node might query whether the storage system 100 has more than two back-end drive arrays 130. This process continues until a leaf node is encountered that has a learned response time for that type of storage system configuration. The process of training the supervised learning process enables the learning process to learn what system configuration parameters and workload features are important. During training, the decision tree identifies features of the storage systems and of the workload that are important in connection with determining the storage system response time, and uses these features to construct the structure of the decision tree (nodes and branches), as well as to populate the leaves of the trees with expected storage system response times.

In some embodiments, as shown in FIG. 2, the supervised learning process for each cluster is implemented as a random forest, wherein each random forest includes a set of decision trees or other supervised machine learning processes. When a set of training examples is used to train a learning process, it is possible for bias in the training set to cause the learning process to learn an output incorporating that bias. To counteract this, it is possible to train multiple independent learning processes using different subsets of training examples or inputting the training examples to the multiple independent learning processes in different orders. Once trained, the set of learning processes (forest) associated with the cluster will each independently be used to predict a response time of a proposed storage system configuration and workload, and the output of the set of learning processes (forest) are averaged together to provide an expected response time as the output. Thus, in some embodiments instead of using a single learning process for each cluster, a forest of learning processes (multiple independent trees) is trained for each cluster.

To explain how this might be implemented using decision trees, assume that training examples 1-20,000 are associated with cluster #1. Instead of using all 20,000 training examples to train/test one decision tree for cluster #1, the 20,000 training examples may be split into four groups with training examples 1-5000 being used to create/train decision tree #1 for cluster #1, training examples 5001-1000 being used to create/train decision tree #2 for cluster #1, training examples 10000-15000 being used to create/train decision tree #3 for cluster #1, and training examples 15001-20000 being used to create/train decision tree #4 for cluster #1. These four separately trained decision tree constitute a random "forest" for cluster #1. In FIG. 2, the set of separately trained decision trees that make up the random forest would constitute one of the supervised learning processes 210 for a given cluster. Accordingly, in an embodiment with seven clusters, training the learning processes would result in seven independent random forests—one for each cluster.

Once the set of decision trees for the random forest is trained, when a new storage system configuration and proposed workload is to be evaluated and is assigned to the cluster, the storage system configuration and proposed workload is provided to each trained decision trees of the random forest associated with the selected cluster. Each decision tree in the random forest will output a response time based on the input system configuration parameters and workload features. The output of each of the decision trees in the random forest can be averaged to arrive at a determined response time from the learning process 210. By separately training independent neural networks, decision trees, or other machine learning processes, using subsets of training examples from the cluster, it is possible for bias in the output of one machine learning process to be counterbalanced by reverse bias of another of the machine learning process to thereby enable the random forest to arrive at a more consistent output value.

Although several embodiments have been described in which particular supervised machine learning processes 210 are implemented using decision trees and/or random forests, it should be emphasized that other machine learning processes can be used that can be trained to regress (predict) a dependent variable (Y) from a set of independent variables (X). In this instance, as shown in FIG. 7, the independent variables (X) are the storage system characteristics and workload features. The dependent variable (Y) is the storage system response time. Example machine learning processes of this nature include various forms of deep neural networks amongst other forms of learning processes. In some embodiments, the learning process 210 is configured as a deep neural network using a supervised regression, which is used to regress (infer) a numeric target value (storage system response time) from one or more input values (storage system characteristics and workload features).

Figure 8:
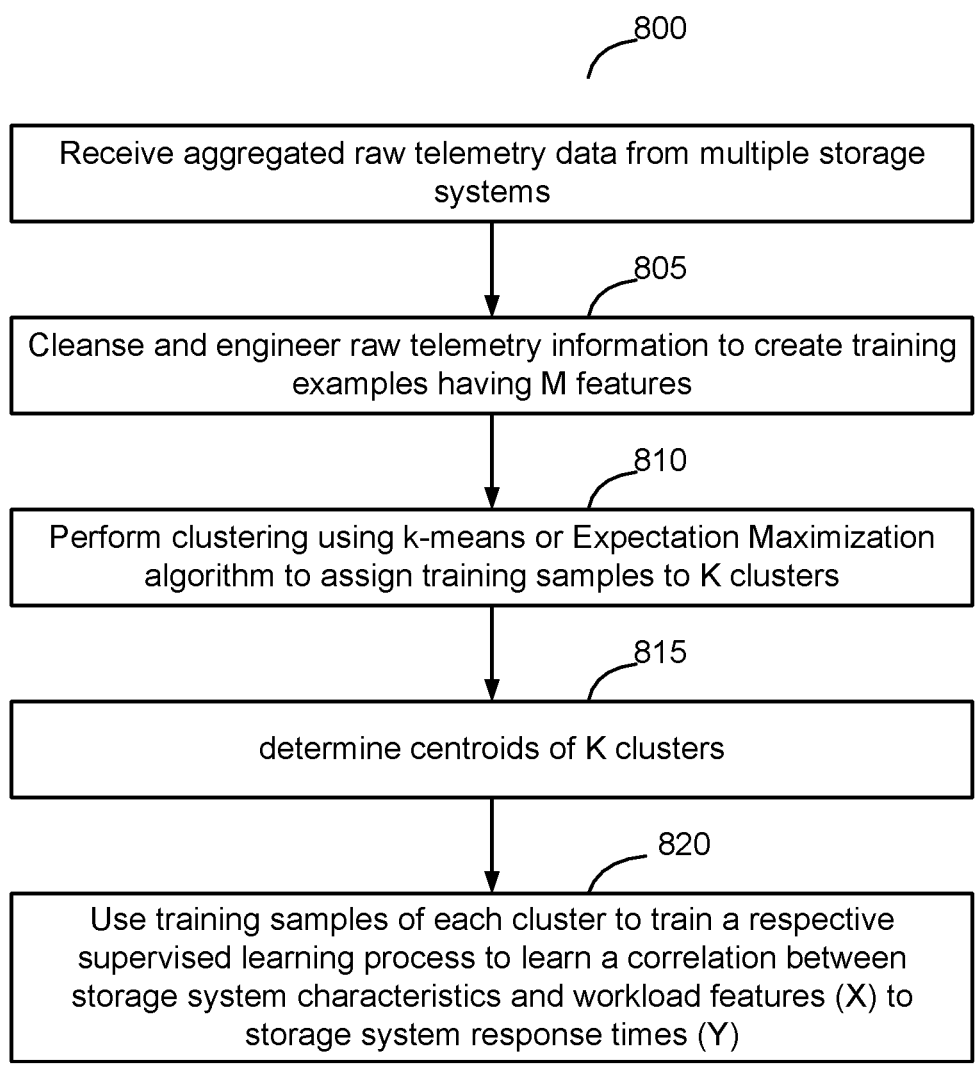
FIG. 8 is a flow chart of an example process of training a set of learning processes to learn a regression between storage system configuration and workload, and storage system response time, according to some embodiments.

FIG. 8 is a flow chart of an example process of training a set of learning processes, according to some embodiments. As shown in FIG. 8, in some embodiments the process includes receiving raw aggregated telemetry data from multiple storage systems (block 800). In some embodiments, the telemetry data includes information describing the type of workload that the storage system performed, response time information in the form of an average amount of time it took the storage system to process an input or an output operation, and storage system characteristics describing the storage system itself. The raw aggregated telemetry data is then cleansed and engineered to create training examples from the raw aggregated telemetry data (block 805). In some embodiments, cleansing the data includes eliminating data or portions of the telemetry data that are aberrations and clearly outside of expected storage system response range.

The training examples are then clustered (block 810). There are many ways of creating clusters of training examples. In some embodiments, the training samples are clustered into K sets of training examples based on M workload features. In some embodiments, the M workload features of the training examples are used by a K-means or Expectation Maximization unsupervised learning process configured to create K clusters of training examples. In some embodiments, once the training examples are clustered, a centroid of each cluster is determined (block 815). Determining the centroid of each cluster enables a future workload to be allocated to one of the clusters, by embedding a location of the future workload in M-dimensional feature space, determining a Euclidian distance in M-dimensional feature space between the location of the future workload and each of the cluster centroids, and allocating the future workload to the cluster with the closest centroid (minimum Euclidian distance) in M-dimensional feature space.

A separate supervised learning process is then trained for each cluster using the set of training examples associated with the cluster (block 820). For example, training samples determined by the unsupervised learning process to belong to cluster #1 are used to train a supervised learning process for cluster #1. Training samples determined by the unsupervised learning process to belong to cluster #2 are used to train a supervised learning process for cluster #2, etc.

Figure 9:
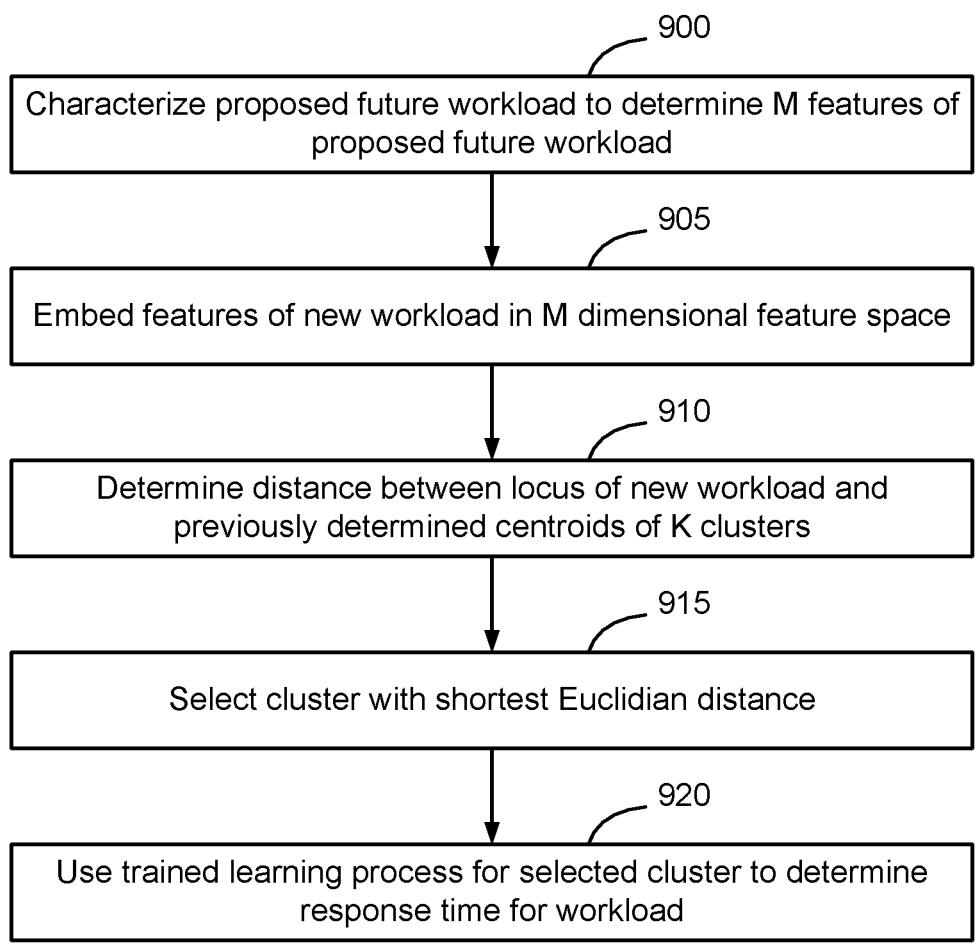
FIG. 9 is a flow chart of an example process of selecting one of the trained learning processes and using the selected learning process to determine a response time of a proposed storage system when processing a proposed future workload, according to some embodiments.

FIG. 9 is a flow chart of an example process of selecting a cluster for a proposed workload, and using the trained learning process for that cluster to determine a response time for the system configuration and workload, according to some embodiments. As shown in FIG. 9, in some embodiments the future workload is characterized to determine M number of features for the workload (block 900). In some embodiments, the future workload is characterized by determining features of the future workload that were used by the unsupervised clustering learning process to assign training examples to clusters. For example, if the unsupervised clustering learning process uses the percentage read and percentage sequential read features to assign training examples to clusters, then the future workload would similarly be characterized by determining the percentage read and percentage sequential read features of the future workload.

The process then determines the distance between the locus of the future workload and the centroids of the clusters in M dimensional feature space. In some embodiments this is implemented by embedding the feature values of the future workload in M dimensional feature space (block 905) and determining the Euclidian distance between the locus of the future workload and each of the centroids of the K clusters (block 910). The cluster with the shortest Euclidian distance is selected (block 915) and the trained learning process for the selected cluster is then used to determine an expected response time for a storage system having the proposed system characteristics for the proposed future workload (block 920).

FIG. 10 is a flow chart of an example process of iterating the process of using a trained learning process for the selected cluster to determine a system configuration capable of providing a required response time for a proposed workload, according to some embodiments.

As shown in FIG. 10, an initial proposed storage system configuration is provided to a storage system performance prediction application 200 (block 1000). The workload characteristics of a proposed future workload is also provided to the storage system performance prediction application 200 (block 1005). The workload characteristics are used by the storage system performance prediction application 200 to assign the proposed future workload to one of the clusters (block 1010). In some embodiments, the unsupervised cluster learning process 205 is used to select the cluster in block 1010.

The initial proposed storage system configuration parameters and the proposed future workload features are provided to a trained supervised learning process corresponding to the selected cluster (block 1015) to obtain an expected storage system response time (block 1020) that the proposed storage system configuration would be expected to provide, when processing the future workload given the features of the future workload. The storage system performance prediction application 200 determines (block 1025) whether the response time is within a required response time range. If the response time for the initial proposed system configuration is not as desired, either too fast or too slow (a determination of NO at block 1025), the storage system parameters are changed (block 1030) and the new storage system parameters and proposed future workload parameters are input to the trained learning process (block 1015). The process shown in blocks 1015, 1020, 1025, and 1030 iterates until the response time is sufficiently close to the required response time (a determination of YES at block 1225).

The storage system parameters that enabled the storage system to meet the required response time for the proposed future workload are then output (block 1035) by the storage system performance prediction application 200.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a workload-oriented prediction of storage system response time, the computer program including a set of instructions which, when executed by a computer, cause the computer to perform a method comprising the steps of:

obtaining a set of training examples, the set of training examples including a plurality of training examples obtained from a plurality of storage systems, each training example being obtained from a respective one of the plurality of storage systems, and including physical configuration information of the storage system describing a number of storage engines and a number of back-end drive arrays of the respective one of the plurality of storage systems, workload features characterizing a workload processed by the respective one of the plurality of storage systems during a time interval, and storage system response time of the respective one of the plurality of storage systems when processing workload characterized by the workload features during the time interval;

clustering the set of training examples into K clusters according to the workload features, each cluster including a subset of the training examples, wherein K is an integer greater than 1 (K≥2); and using each subset of training examples to train a respective supervised learning process for the cluster, to cause each supervised learning process to learn a respective regression between two independent variables, the number of storage engines and number of back-end drive arrays of the storage system and the workload features, and a dependent variable, the storage system response time;

wherein each of the supervised learning processes is a decision tree supervised learning process, each decision tree including a plurality of branches containing nodes and terminating at leaves, the nodes of the decision trees being the number of storage engines and the number of back-end drive arrays of the storage system, and the leaves of the comprise nodes of the decision tree being the learned storage system response times.

2. The non-transitory tangible computer readable storage medium of claim 1, wherein each training example further includes information describe features of a respective storage system that was used to process a workload during a time interval, the features of the respective storage system including a number and capacity of managed drives and a size of local volatile memory, the workload features are derived from the workload during the time interval, and the storage system response time describes the average response time of the storage system when the storage system processed the workload during the time interval.

3. The non-transitory tangible computer readable storage medium of claim 1, wherein clustering the set of training examples into K clusters causes training examples based on workloads with similar workload features to be assigned to the same clusters.

4. The non-transitory tangible computer readable storage medium of claim 1, wherein the step of clustering the set of training examples comprises providing the set of training examples to an unsupervised clustering learning process.

5. The non-transitory tangible computer readable storage medium of claim 4, wherein the unsupervised clustering learning process is a K-means learning process.

6. The non-transitory tangible computer readable storage medium of claim 1, wherein each of the supervised learning processes is configured to implement multivariate regression.

7. The non-transitory tangible computer readable storage medium of claim 1, wherein each of the supervised learning processes is a random forest, each random forest including a set of decision tree supervised learning processes.

8. The non-transitory tangible computer readable storage medium of claim 1, further comprising selecting one of the trained supervised learning processes of one of the clusters; and
using the selected trained supervised learning process to determine an expected response time for a proposed storage system configuration and proposed future workload, the proposed storage system configuration specifying a number of storage engines and a number of back-end drive arrays to be used to implement the proposed storage system.

9. The non-transitory tangible computer readable storage medium of claim 8, wherein the step of selecting comprises:
embedding a locus of the proposed future workload in M-dimensional feature space based on workload features of the proposed future workload;
determining a Euclidian distance between the locus of the proposed future workload and centroids of the clusters in M-dimensional feature space; and
selecting a cluster with the smallest Euclidian distance.

10. The non-transitory tangible computer readable storage medium of claim 8, wherein the step of using the selected trained learning process comprises providing the proposed storage system configuration and proposed future workload as input to the selected trained learning process.

11. The non-transitory tangible computer readable storage medium of claim 10, wherein the proposed future workload is characterized using the workload features that were used in the step of clustering the set of training examples.

12. The non-transitory tangible computer readable storage medium of claim 8, further comprising comparing the expected response time for the proposed storage system configuration with a required response time to determine whether the expected response time of the proposed storage system configuration is sufficiently equal to the required response time; and
in response to a determination that the expected response time of the proposed storage system configuration is not sufficiently equal to the required response time, automatically adjusting the proposed storage system configuration to create a changed storage system configuration, the changed storage system configuration specifying a changed number of storage engines or a changed number of back-end drive arrays to be used to implement the changed storage system configuration, and providing the changed storage system configuration and proposed future workload to the selected trained supervised learning process.

13. The non-transitory tangible computer readable storage medium of claim 12, further comprising iterating the steps of comparing the expected response time for the changed storage system configuration with a required response time and changing the number of storage engines and number of back-end drive arrays of the storage system configuration until the expected response time is sufficiently equal to the required response time.

14. A method of predicting response time of a storage system, comprising:
obtaining a set of training examples, the set of training examples including a plurality of training examples obtained from a plurality of storage systems, each training example being obtained from a respective one of a plurality of storage systems, and including physical configuration information of the storage system describing a number of storage engines and a number of back-end drive arrays of the respective one of the plurality of storage systems, workload features characterizing a workload processed by the respective one of the plurality of storage systems during a time interval, and storage system response time of the respective one of the plurality of storage systems when processing workload characterized by the workload features during the time interval, in which the storage system characteristics of each training example describe features of a respective storage system that was used to process a workload during a time interval, the workload features are derived from the workload during the time interval, and the storage system response time describes the average response time of the storage system when the storage system processed the workload during the time interval;
clustering the set of training examples into K clusters according to the workload features using an unsupervised learning process, each cluster including a subset of the training examples to cause training examples based on workloads with similar workload features to be assigned to the same clusters, wherein K is an integer greater than 1 (K≥2); and
using each subset of training examples to train a respective supervised learning process for the cluster, to cause each supervised learning process to learn a respective regression between two independent variables, the number of storage engines and number of back-end drive arrays of the storage system and the workload features, and a dependent variable, the storage system response time;

wherein each of the supervised learning processes is a decision tree supervised learning process, each decision tree including a plurality of branches containing nodes and terminating at leaves, the nodes of the decision trees being the number of storage engines and the number of back-end drive arrays of the storage system, and the leaves of the comprise nodes of the decision tree being the learned storage system response times.

15. The method of claim 14, wherein:

the unsupervised learning process is a K-means learning process; and wherein each of the supervised learning processes is a respective supervised learning process configured to implement multivariate regression.

16. The method of claim 14, further comprising:

selecting one of the trained supervised learning processes of one of the clusters; and using the selected trained supervised learning process to determine an expected response time for a proposed storage system configuration and proposed future workload.

17. The method of claim 16, wherein the step of selecting comprises:

embedding a locus of the proposed future workload in an M-dimensional feature space based on workload features of the proposed future workload;

determining a Euclidian distance between the locus of the proposed future workload and centroids of the clusters in the M-dimensional feature space; and selecting a cluster with the smallest Euclidian distance.

18. The method of claim 16:

wherein the step of using the selected trained learning process comprises providing the proposed storage system configuration and proposed future workload as input to the selected trained learning process; and wherein the proposed future workload is characterized using the workload features that were used in the step of clustering the set of training examples.

* * * * *